(12) United States Patent
Yu et al.

(10) Patent No.: US 9,078,147 B2
(45) Date of Patent: Jul. 7, 2015

(54) APPARATUS AND METHOD USING COMMON CONTROL CHANNEL CARRIER FOR FREQUENCY AND TIME ESTIMATION

(71) Applicant: QUALCOMM Incorporated, San Diego, CA (US)

(72) Inventors: Zhi-Zhong Yu, Reading (GB); Divaydeep Sikri, Farnborough (GB); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/026,595

(22) Filed: Sep. 13, 2013

(65) Prior Publication Data
US 2015/0078493 A1 Mar. 19, 2015

(51) Int. Cl.
| | |
|---|---|
| H04B 7/00 | (2006.01) |
| H04W 24/02 | (2009.01) |
| H04W 72/04 | (2009.01) |
| H04J 11/00 | (2006.01) |
| H04L 27/26 | (2006.01) |

(52) U.S. Cl.
CPC ............ *H04W 24/02* (2013.01); *H04W 72/042* (2013.01); *H04J 11/0036* (2013.01); *H04L 27/2688* (2013.01)

(58) Field of Classification Search
USPC ............... 455/63.1, 33, 524, 513, 525, 452.2, 455/450, 452.1, 436, 552.1, 426.1; 370/203, 209, 210, 320, 441, 479, 516, 370/337, 522, 347, 321; 375/149, 326, 375, 375/345, 376, 260, 134, 150
See application file for complete search history.

(56) References Cited

U.S. PATENT DOCUMENTS

| | | | | |
|---|---|---|---|---|
| 5,101,501 | A * | 3/1992 | Gilhousen et al. | 455/442 |
| 5,691,974 | A * | 11/1997 | Zehavi et al. | 370/203 |
| 7,146,141 | B2 * | 12/2006 | Chen | 455/232.1 |
| 7,986,661 | B2 * | 7/2011 | Bhattacharjee et al. | 370/329 |
| 8,260,328 | B1 | 9/2012 | Yellin et al. | |
| 2007/0207824 | A1 * | 9/2007 | Bhattacharjee et al. | 455/513 |
| 2007/0242766 | A1 * | 10/2007 | Xu et al. | 375/260 |
| 2011/0092231 | A1 | 4/2011 | Yoo et al. | |
| 2011/0244807 | A1 | 10/2011 | Yoon et al. | |
| 2011/0286376 | A1 | 11/2011 | Yoo et al. | |
| 2013/0012135 | A1 * | 1/2013 | Ruohonen et al. | 455/63.1 |

FOREIGN PATENT DOCUMENTS

| | | |
|---|---|---|
| CN | 102685047 A | 9/2012 |
| EP | 1798863 A1 | 6/2007 |
| WO | WO-2008112526 A2 | 9/2008 |

OTHER PUBLICATIONS

International Search Report and Written Opinion—PCT/US2014/055207—ISA/EPO—Jan. 23, 2015.

* cited by examiner

*Primary Examiner* — Ganiyu A Hanidu
(74) *Attorney, Agent, or Firm* — Loza & Loza LLP

(57) ABSTRACT

Apparatus and methods are disclosed to improve a user equipment's capability of performing time and frequency tracking by utilizing two carriers when the channel interference on one of the carriers is greater than a certain threshold. In one aspect of the disclosure, a user equipment (UE) determines that channel interference of a first carrier is greater than an interference threshold. The UE performs frequency tracking and time tracking in accordance with information received from a second carrier, and performs interference cancellation in accordance with the frequency tracking and time tracking. Other aspects, embodiments, and features are also claimed and described.

32 Claims, 12 Drawing Sheets

APPARATUS AND METHOD USING COMMON CONTROL CHANNEL CARRIER FOR FREQUENCY AND TIME ESTIMATION

TECHNICAL FIELD

The technology discussed below relates generally to wireless communication systems, and more particularly, to channel frequency and time estimation at a mobile station in a wireless communication network.

BACKGROUND

Some wireless mobile equipment (called mobile station, MS, user equipment or UE in 3GPP terminology such as GSM, but also called access terminal, etc. in various literature) use a SIM/USIM card (subscriber identity module/universal subscriber identity module). This card can a subscriber's identity for security and authentication purposes. Some UEs have multi-SIM capability so a user can engage in calls on two different subscriptions. These two subscriptions might be on the same network or on different networks. Some multi-SIM mobile devices only utilize a single transceiver, which is shared for use by both subscriptions while some multi-SIM mobile devices utilize separate transceiver for each SIM.

In today's highly developed wireless industry, the wireless spectrum is essentially fully utilized to meet the ever increasing capacity demand. However, the more loaded a network is, the more interference it has. This presents a challenge to a mobile UE, as it is difficult to maintain an ongoing call with an acceptable quality of service (QoS) in such interference-limited conditions. In live networks, such interference limited conditions frequently occur. In these conditions, a network may not be able to fully utilize its capacity, and user experience can suffer. UEs operating according to GSM standards follow a specified burst structure to identify a training sequence code (TSC) at the middle of each burst, and then work out the fine details for time and frequency tracking. These parameters provide the prerequisites for an interference cancellation algorithm to work well. However, in a network with heavy interference, a UE may have difficulty performing time and frequency tracking.

BRIEF SUMMARY OF SOME EXAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Apparatus and methods are disclosed to improve a user equipment's capability of performing time and frequency tracking by utilizing two carriers when the channel interference on one of the carriers is greater than a certain threshold.

In one aspect, the disclosure provides a method of wireless communication operable at a user equipment (UE). The UE determines that channel interference of a first carrier is greater than an interference threshold. The UE performs frequency tracking and time tracking in accordance with information received from a second carrier, and performs interference cancellation in accordance with the frequency tracking and time tracking.

Another aspect of the disclosure provides an apparatus for wireless communication. The apparatus includes means for determining that channel interference of a first carrier is greater than an interference threshold, means for performing frequency tracking and time tracking in accordance with information received from a second carrier, and means for performing interference cancellation in accordance with the frequency tracking and time tracking.

Another aspect of the disclosure provides an apparatus for wireless communication including at least one processor, a memory coupled to the at least one processor, and a transceiver coupled to the at least one processor. The at least one processor is configured to: determine that channel interference of a first carrier is greater than an interference threshold; perform frequency tracking and time tracking in accordance with information received from a second carrier; and perform interference cancellation in accordance with the frequency tracking and time tracking.

Another aspect of the disclosure provides a computer program product including a computer-readable storage medium. The computer-readable storage medium includes code for causing a user equipment (UE) to: determine that channel interference of a first carrier is greater than an interference threshold; perform frequency tracking and time tracking in accordance with information received from a second carrier; and perform interference cancellation in accordance with the frequency tracking and time tracking.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
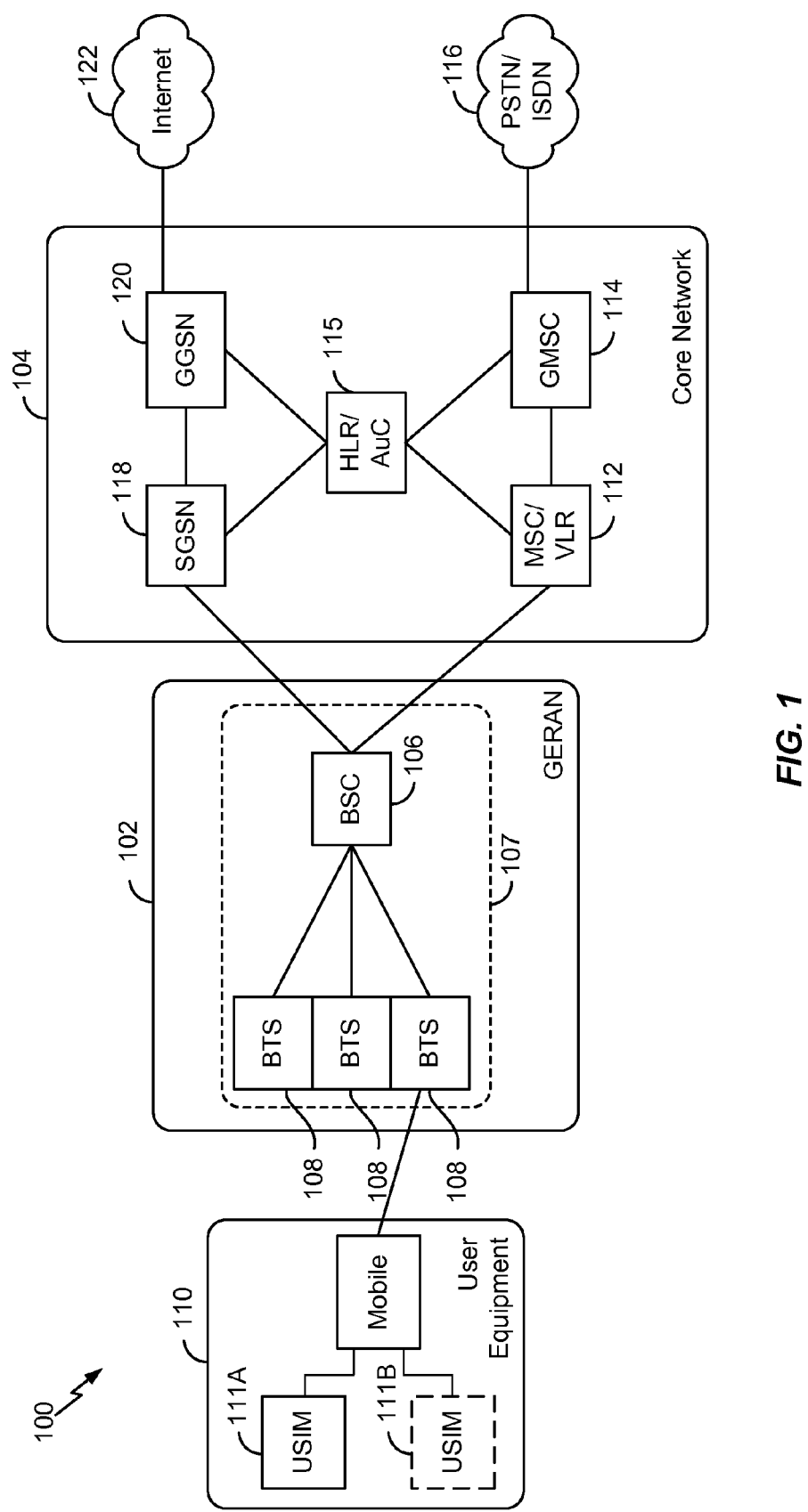
FIG. 1 is a block diagram conceptually illustrating an example of a telecommunications system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While a legacy Global System for Mobile Communications (GSM) user equipment (UE) has relatively good interference cancellation capabilities, timing and frequency estimation errors can still cause the UE to drop calls. In many cases, frequency and timing estimation is the weakest link of the UE's interference handling capability under strong interference conditions. In other words, if frequency and timing of the communication channels can be estimated correctly, the UE can perform suitable interference cancellation to avoid dropped calls. Therefore, various aspects of the present disclosure provide an algorithm that can avoid or improve this "weakest link" when needed, to avoid dropped calls even in heavy interference scenarios.

One or more aspects of the disclosure provide a wireless UE configured to switch to a carrier that supports signaling channels (e.g., common control channels (CCCHs) to perform time and frequency estimation when the UE is under heavy interference. Hereinafter, the carrier supporting signaling channels is referred to as CCCH carrier. However, it should be noted that the CCCH carrier can carry both signaling channels and traffic channels (TCH). As a general rule for GSM frequency/cell planning, the CCCH carrier is relatively cleaner than the carriers that support only TCH. It is because the CCCH layer employs a loose frequency reuse pattern, while the TCH layer may have a tighter frequency reuse compared to that of the CCCH layer. Thus, in accordance with an aspect of the present disclosure, when the TCH only carrier is fully or substantially occupied and the UE observes heavy interference, the UE may tune to its CCCH carrier for timing and frequency tracking/estimation, and then utilizes the more accurate frequency and time information for interference cancellation processing.

The various concepts presented throughout this disclosure may be implemented across a broad variety of telecommunication systems, network architectures, and communication standards. Specific examples are provided below with reference to a GSM/EDGE Radio Access Network (GERAN) system. However, the concepts disclosed can be applied to any time-division-based system, such as but not limited to a UMTS system using a TDD air interface, or an e-UTRA system using a TD-LTE air interface. In some aspects, the UE may be equipped with multiple SIMs (e.g., dual-SIM) provisioned to the same or different networks utilizing one or more antennas and transceivers.

Referring now to FIG. 1, as an illustrative example without limitation, various aspects of the present disclosure are illustrated with reference to a Global System for Mobile (GSM) system 100. A GSM network includes three interacting domains: a core network 104 (e.g., a GSM/GPRS core network), a radio access network (RAN) (e.g., the GSM/EDGE Radio Access Network (GERAN) 102), and a user equipment (UE) 110. In this example, the illustrated GERAN 102 may employ a GSM air interface for enabling various wireless services including telephony, video, data, messaging, broadcasts, and/or other services. The GERAN 102 may include a plurality of Radio Network Subsystems (RNSs) such as an RNS 107, each controlled by a respective Base Station Controller (BSC) such as a BSC 106. Here, the GERAN 102 may include any number of BSCs 106 and RNSs 107 in addition to the illustrated BSCs 106 and RNSs 107. The BSC 106 is an apparatus responsible for, among other things, assigning, reconfiguring, and releasing radio resources within the RNS 107.

The geographic region covered by the RNS 107 may be divided into a number of cells, with a radio transceiver apparatus serving each cell. A radio transceiver apparatus is commonly referred to as a base transceiver station (BTS) in GSM applications, but may also be referred to by those skilled in the art as a base station (BS), a Node B, a radio base station, a radio transceiver, a transceiver function, a basic service set (BSS), an extended service set (ESS), an access point (AP), or some other suitable terminology. For clarity, three BTSs 108 are shown in the illustrated RNS 107; however, the RNS 107 may include any number of wireless BTSs 108. The BTSs 108 provide wireless access points to a GSM/GPRS core network 104 for any number of mobile apparatuses. Examples of a mobile apparatus include a cellular phone, a smart phone, a session initiation protocol (SIP) phone, a laptop, a notebook, a netbook, a smartbook, a tablet computer, a personal digital assistant (PDA), a satellite radio, a global positioning system (GPS) device, a multimedia device, a video device, a digital audio player (e.g., MP3 player), a camera, a game console, or any other similar functioning devices. The mobile apparatus is commonly referred to as user equipment (UE) in GSM applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The GSM "Um" air interface generally utilizes GMSK modulation (although later enhancements such as EGPRS, described below, may utilize other modulation such as 8PSK), combining frequency hopping transmissions with time division multiple access (TDMA), which divides a frame into 8 time slots. Further, frequency division duplexing (FDD) divides uplink and downlink transmissions using a different carrier frequency for the uplink than that used for the downlink. Those skilled in the art will recognize that although various examples described herein may refer to GSM Um air interface, the underlying principles are equally applicable to any other suitable air interfaces.

In some aspects of the disclosure, the GSM system 100 may be further configured for enhanced GPRS (EGPRS). EGPRS is an extension of GSM technology providing increased data rates beyond those available in 2G GSM technology. EGPRS is also known in the field as Enhanced Data rates for GSM Evolution (EDGE), and IMT Single Carrier.

Specific examples are provided below with reference to a GERAN system. However, the concepts disclosed in various aspects of the disclosure can be applied to any time-division-based system, such as but not limited to a UMTS system using a TDD air interface, or an e-UTRA system using a TD-LTE air interface. Especially in the multi-SIM examples (described in further detail below), the multiple subscriptions might be on any one or more of these systems.

That is, in some aspects of the disclosure, the UE 110 may include a plurality of universal integrated circuit cards (UICC), each of which may run one or more universal subscriber identity module (USIM) applications 111 (e.g., 111A and 111B). A USIM stores the subscriber's identity, and provides a user's subscription information to a network as well as performing other security and authentication roles. The illustrated UE 110 includes two USIMs 111A and 111B, but those of ordinary skill in the art will understand that this is illustrative in nature only, and a UE may include any suitable number of USIMs. UEs such as the UE 110 having multiple USIMs are sometimes referred to as multi-SIM/multiple standby devices, with one particular with two USIMs example being called Dual SIM Dual Standby (DSDS) device or dual-SIM device. A DSDS device is generally capable of being active on two networks concurrently or simultaneously in standby mode, where a transceiver at the UE 110 is time-shared by two subscriptions on the respective networks. In this way, connections or calls may be established on either of the networks or subscriptions with a single device. Another example of multi-SIM devices is called Dual SIM Dual Active (DSDA) device. A DSDA device has multiple transceivers that enable the DSDA device to establish multiple active connections to multiple carriers/networks at the same time. In some aspects of the disclosure, the DSDA device may utilize multiple transceivers/antennas to concurrently access multiple carriers in the same network. Here, the multiple carriers may have different frequencies.

For illustrative purposes, one UE 110 is shown in communication with one BTS 108 in FIG. 1. The downlink (DL), also called the forward link, refers to the communication link from a BTS 108 to a UE 110, and the uplink (UL), also called the reverse link, refers to the communication link from a UE 110 to a BTS 108.

The core network 104 can interface with one or more access networks, such as the GERAN 102. As shown, the core network 104 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more BSCs, such as the BSC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the GERAN 102 to a packet-based network 122. The packet-based network 122 may be the Internet, a private data network, or some other suitable packet-based networks. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

In some aspects of the disclosure, the illustrated UE 110 may be a DSDA device capable of simultaneously or concurrently maintaining communication on two carriers in the GSM network 100. For example, the carriers may be a CCCH carrier and the other carrier may be a TCH only carrier. Unless all base stations BTSs 108 are synchronized, the two carriers are from the same base station.

Figure 2:
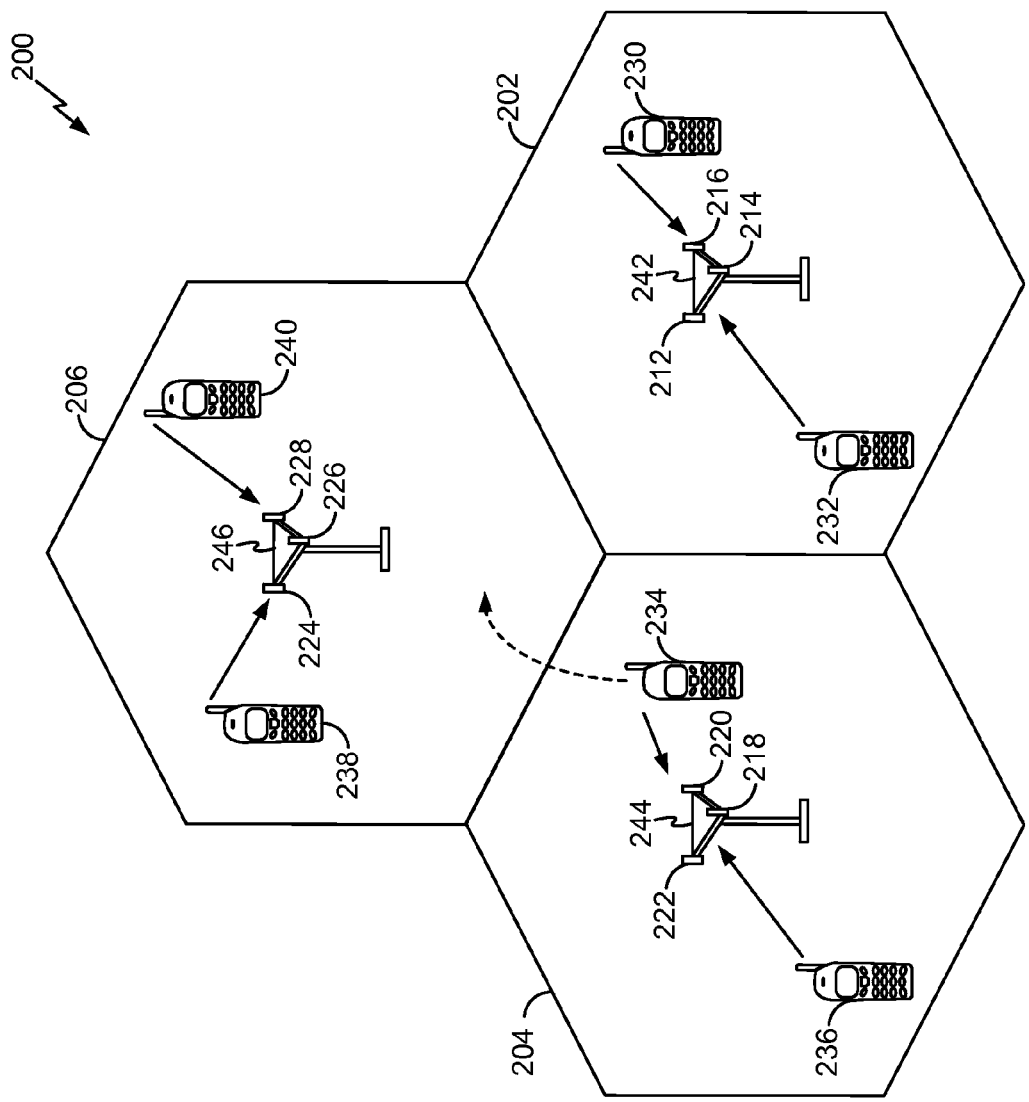
FIG. 2 is a diagram conceptually illustrating an example of an access network according to some aspects of the disclosure.

The GERAN 102 is one example of a RAN that may be utilized in accordance with the present disclosure. Referring to FIG. 2, by way of example and without limitation, a simplified schematic illustration of a RAN 200 in a GERAN architecture is illustrated. The system includes multiple cellular regions (cells), including cells 202, 204, and 206, each of which may include one or more sectors. Cells may be defined geographically, e.g., by coverage area. In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. Similarly, in cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with a BTS 242, UEs 234 and 236 may be in communication with a BTS 244, and UEs 238 and 240 may be in communication with a BTS 246. Here, each BTS 242, 244, and 246 may be configured to provide an access point to a core network 104 (see FIG. 1) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (e.g., the UMTS RAN cells that are currently assigning a downlink dedicated physical channel DPCH or fractional downlink dedicated physical channel F-DPCH to the UE 236 may constitute the Active Set). In addition, the transmission from the neighboring cells and other cells of other networks in the same area can cause heavy interference that the UE 236 needs to deal with using suitable interference cancellation technique. In order to effectively perform interference cancellation, the UE 236 needs to track or estimate time and frequency of the communication carriers in the serving cell (e.g., cell 204). Aspects of the present disclosure provide an algorithm that can estimate and track time and frequency of the serving cell in heavy interference scenarios. The algorithm will be described fully below.

Figure 3:
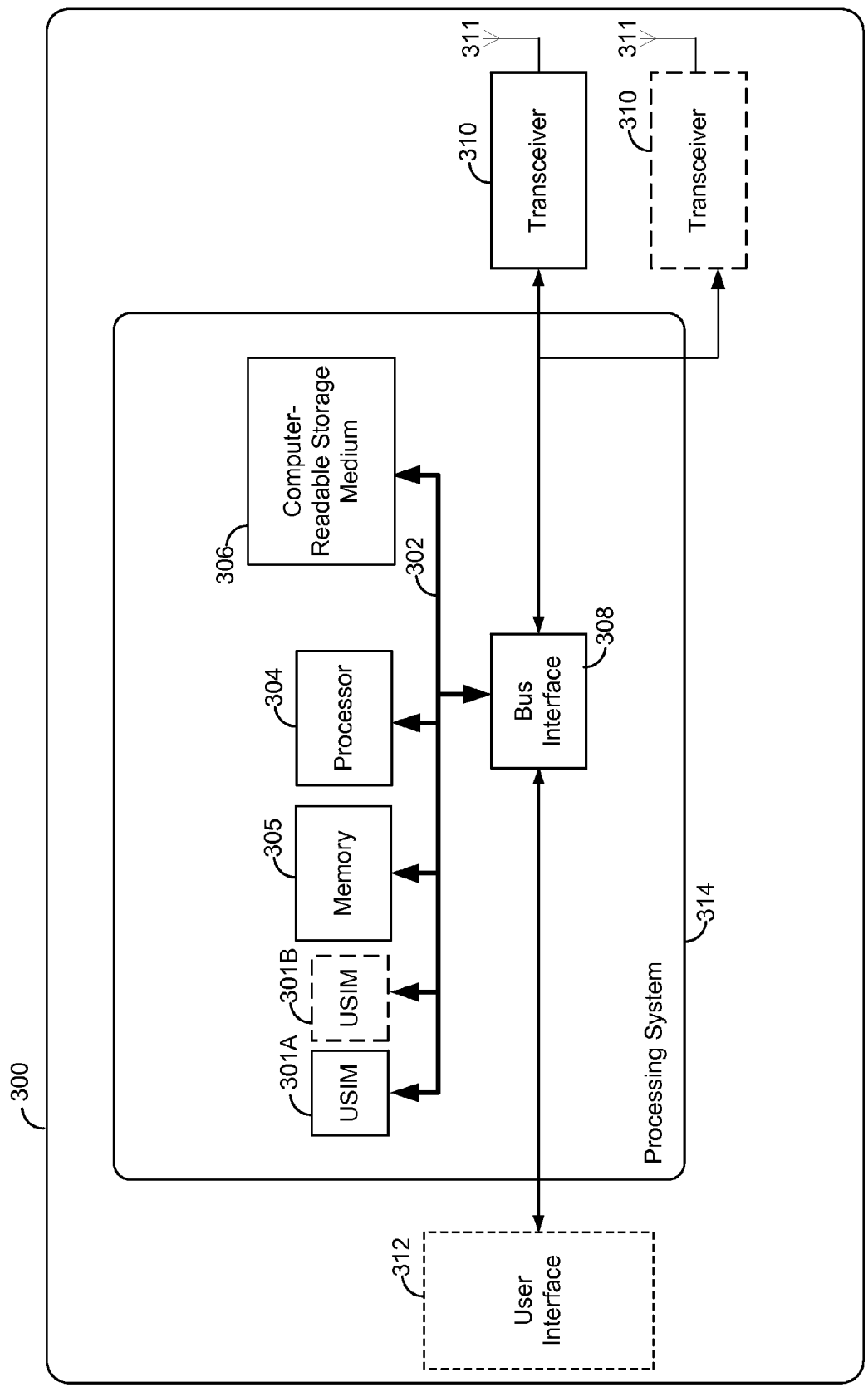
FIG. 3 is a block diagram conceptually illustrating an example of a hardware implementation for a user equipment employing a processing system according to some aspects of the disclosure.

FIG. 3 is a block diagram illustrating an example of a hardware implementation for a UE 300 employing a processing system 314. In one aspect, the UE 300 may be used as the UE 110. In accordance with various aspects of the disclosure, an element, or any portion of an element, or any combination of elements may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits or components including one or more processors (represented generally by the processor 304), a memory 305, computer-readable media (represented generally by the computer-readable medium 306), and one or more USIMs (e.g., dual USIMs 301A and 301B). The bus 302 may also link various other circuits such as timing sources, peripherals, voltage regulators, and power management circuits, which are well known in the art, and therefore, will not be described any further. A bus interface 308 provides an interface between the bus 302 and one or more transceivers 310. The transceivers 310 provide a means for communicating with various other apparatus over a transmission medium via antennas 311.

In some aspects of the disclosure, the illustrated UE 300 including two USIMs 301A and 301B, each USIM may utilize a transceiver 310 and an antenna 311 for communication with a corresponding network. However, in various aspects of the disclosure, the UE 300 may be configured to selectively assign both transceivers 310 and antennas 311 to the same USIM such that the USIM may access multiple carriers of the same network concurrently or simultaneously so as to perform the below-described time and frequency tracking algorithm.

Depending upon the nature of the apparatus, a user interface 312 (e.g., keypad, display, speaker, microphone, joystick) may also be provided. The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
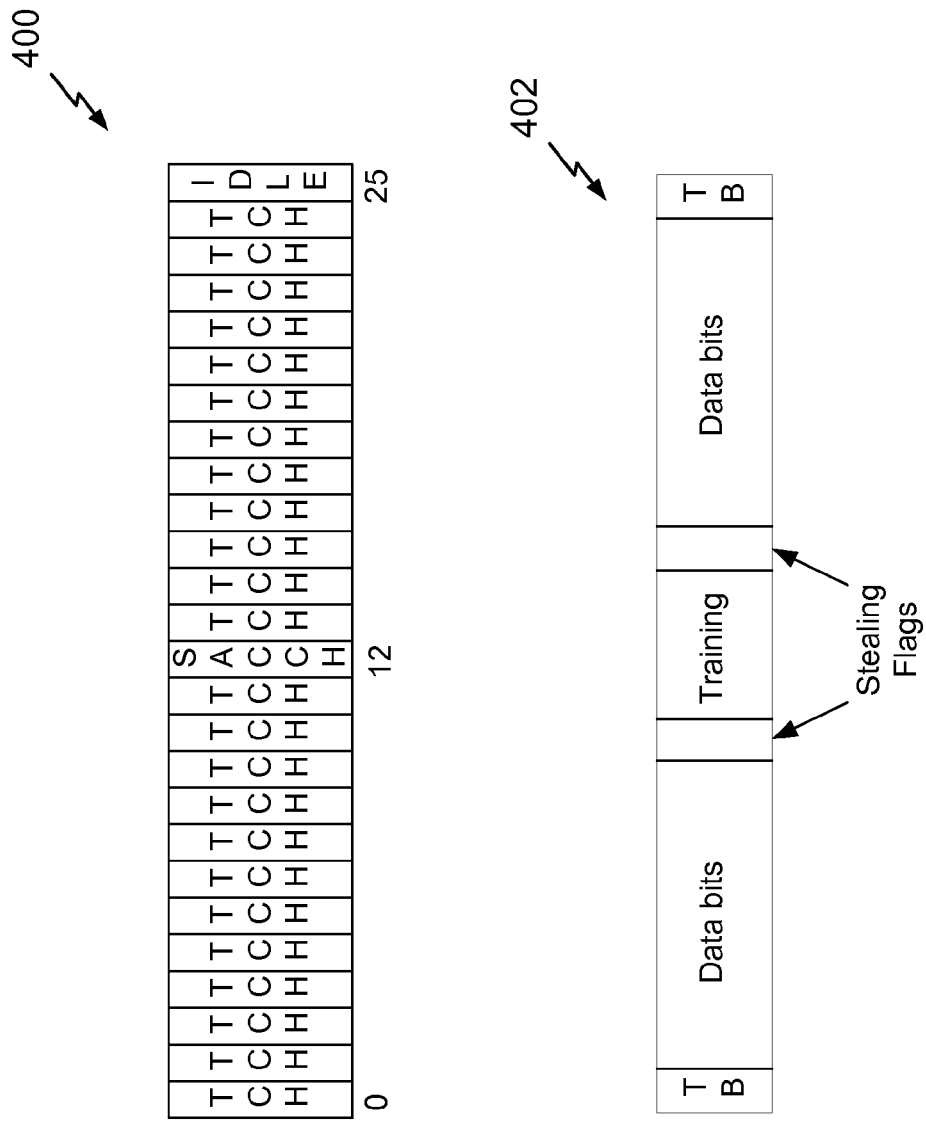
FIG. 4 is a diagram conceptually illustrating the physical channel structure of a traffic channel (TCH) multiframe and a normal burst for Global System for Mobile Communications (GSM).

When a UE (e.g., UE 110 or 300) is active or actively communicating with a base station (e.g., BTS 108) via a communication link or carrier, a traffic channel (TCH) may be used to carry encoded speech and data to and from the UE. FIG. 4 is a conceptual diagram illustrating the physical channel structure of a TCH multiframe 400 for GSM during an ongoing call. Encoded speech is voice audio that is converted into digital form and compressed. GSM divides up each absolute radio-frequency channel number (ARFCN) into eight time slots. These eight time slots are further broken up into logical channels. Different time slots will carry different logical channels, depending on the structure the base station subsystem (BSS) uses. Here, the TCH multiframe 400 includes twenty-six TDMA frames (26-multiframe). Among these frames are twenty-four traffic frames labeled TCH (frames 0-11 and 13-24), one idle frame labeled IDLE (frame 25), and one slow associated control channel (SACCH) frame (frame 12). The TCH frames carry encoded voice packets and acknowledged mode control messages in both directions. The SACCH frame carries un-acknowledged mode control messages in both directions.

The UE may track frequency and time using information from the TCH frame. In GSM, each TCH frame is time-divided into eight time slots, and the UE is assigned to one of the time slots. The data transmitted during a single time slot of the TCH frame may be a normal burst 402. Each normal burst 402 has three tail bits (TB) on each end in which no data is transmitted. This is designed to compensate for the time it takes for the power to rise up to its peak during a transmission. Also, the tail bits compensate for the powering down at the end of the transmission. There are two data payloads (data bits) of fifty-seven bits each. Stealing flags indicate whether the burst is being used for voice/data or if the burst is being "stolen" for signaling. The training sequence bits (Training) are used to overcome multi-path fading and propagation effects through a method called equalization. When the TCH is clean, the UE may utilize the training sequence bits to track time and frequency of the communication link.

The clean TCH can be determined by a parameter or metrics as a result of burst processing, such as signal to noise ratio (SNR), bit error probability (BEP), power level, and Cyclic redundancy check (CRC) of the radio block. When the TCH is clean, the UE can estimate the time and frequency of the link based on the training sequence bits. Then the UE can decode the payload of the burst based on the estimated time and frequency. In addition, the UE may estimate the time and frequency for tracking based on the whole burst, i.e. training sequence, decoded payload and tail bits, if needed. However, when channel interference is heavy, or the TCHs are fully utilized, causing co-channel interferences (CCIs) and adjacent channel interferences (ACIs), or in weak wanted signal situations, the UE may have trouble tracking frequency and time based on information from the allocated TCH.

In accordance with an aspect of the present disclosure, when the TCHs are fully or substantially occupied and a UE (e.g., UE 300) observes heavy interference, the UE can tune away from the current TCH only carrier to its CCCH carrier for timing and frequency tracking, and then utilizes this more accurate frequency and time information for interference cancellation. The CCCH carrier provides various signaling channels including a frequency correction channel (FCCH) and synchronization channel (SCH), in order to help the UE achieve the better level of frequency and time tracking. The CCCH carrier also includes a broadcast control channel (BCCH), an absolute grant channel AGCH, and a paging channel PCH that may also be used to perform frequency and time tracking. These channels appear every 10 frames, which is about every forty-seven milliseconds (ms), frequently enough for frequency and time tracking.

Figure 5:
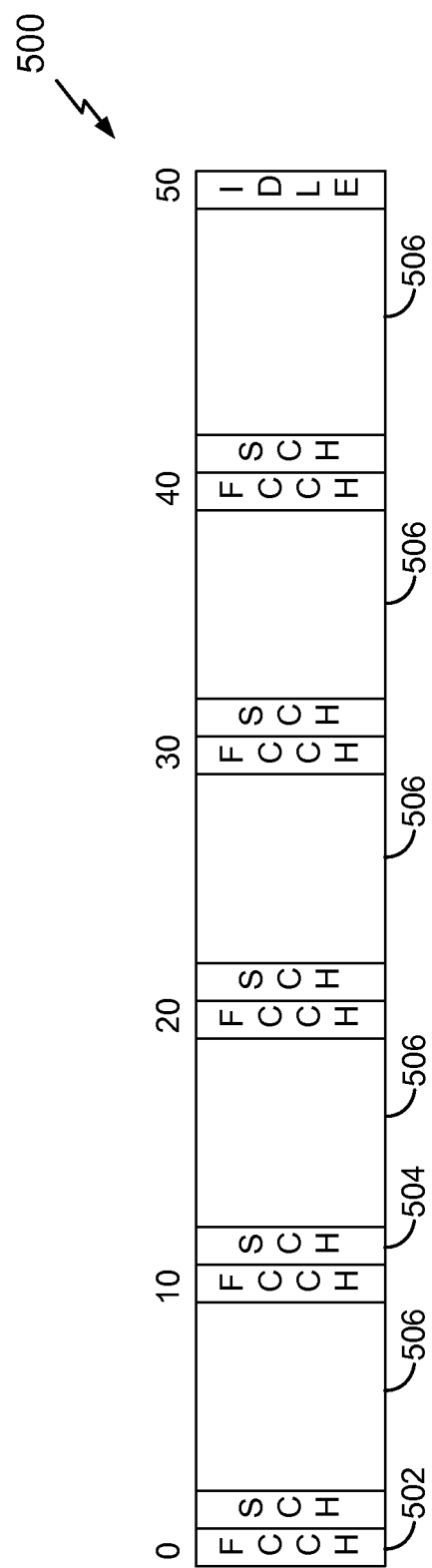
FIG. 5 is a diagram conceptually illustrating the physical channel structure of a signaling channel multiframe for GSM.

In GSM, a signaling channel (or control channel) is composed of fifty-one TDMA frames (51-multiframe). FIG. 5 is a drawing illustrating a physical channel structure example of a 51-multiframe 500 with various control channels in GSM. However, it should be noted that the present disclosure is not limited to the particular channel structure of FIG. 5, and other channel structures allowed in the GSM standard may be used in various aspects of the disclosure. In this particular channel structure, the FCCH (e.g., FCCH 502) will repeat on every 0th, 10th, 20th, 30th, and 40th frames of the multiframe 500, and the SCH (e.g., SCH 504) will repeat on every 1th, 11th, 21th, 31th, and 41th frames of the multiframe 500. Therefore, there are five FCCH frames and five SCH frames in the multiframe 500. The FCCH generates a tone on the radio channel that can be used by the UE to discipline (adjust) its local oscillator. The SCH transmits a base station identity code and the current value of the TDMA clock. Other frames 506 (frames 2-9, 12-19, 22-29, 32-39, and 42-49) of the multiframe 500 may be used to transmit other CCCH signaling channels (e.g., BCCH).

Figure 6:
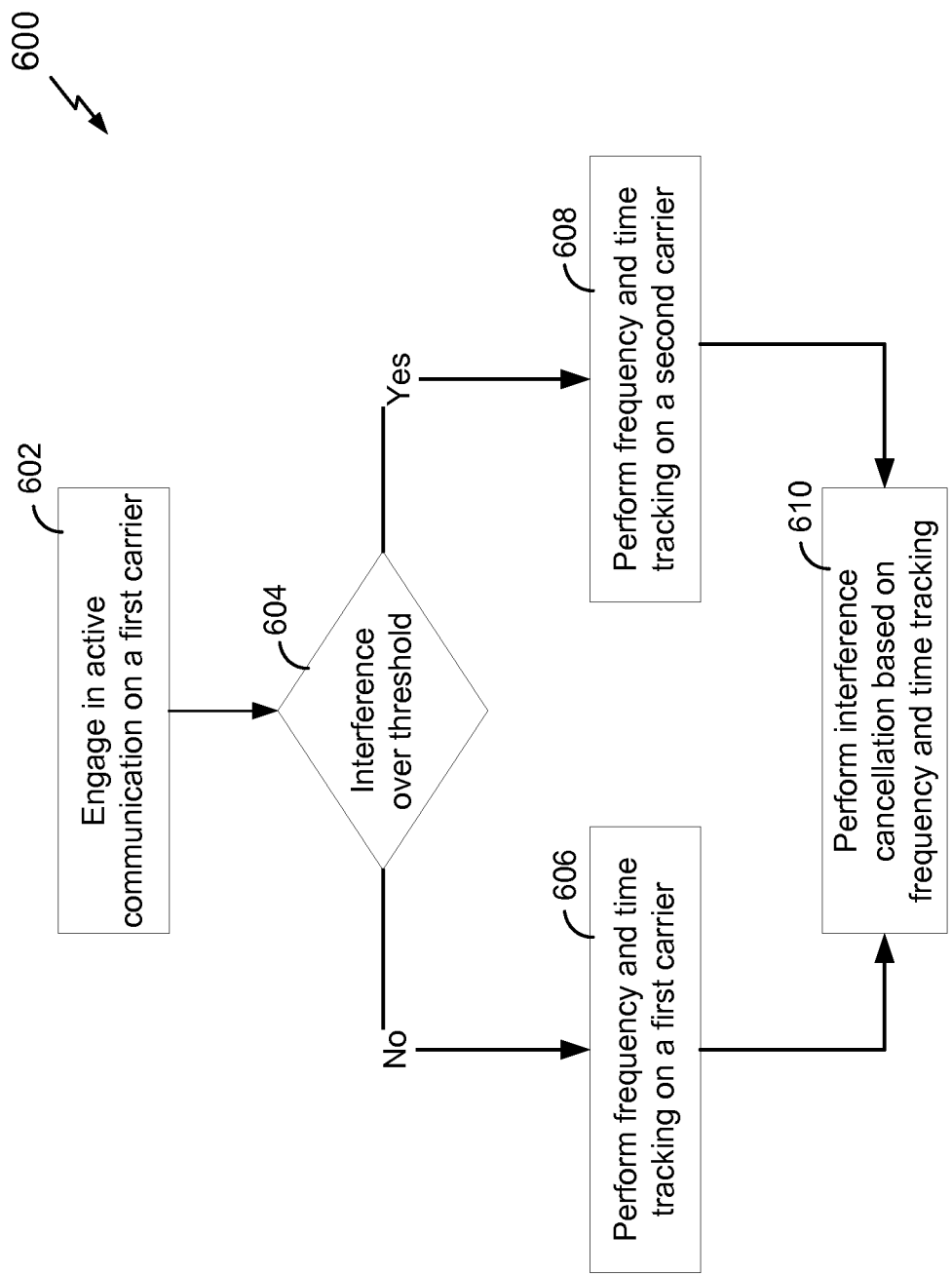
FIG. 6 is a flow chart illustrating an algorithm for reducing dropped calls in heavy interference scenarios in accordance with an aspect of the disclosure.

FIG. 6 is a flow chart illustrating an algorithm 600 operable at a UE for reducing dropped calls in heavy interference scenarios in accordance with an aspect of the disclosure. The algorithm 600 may be performed by a UE 300. In a step 602, the UE engages in active communication on a first carrier (e.g., a TCH only carrier; first carrier 700 in FIG. 7). For example, the UE may utilize a first transceiver (e.g., a transceiver 310) and a first antenna (e.g., antenna 311) to communicate with a base station via the first carrier. In a step 604, the UE determines channel interference in the network. If channel interference is below a certain threshold (e.g., a predetermined threshold, for GSMK (Gaussian minimum-shift keying) modulated signal at 2 dB, and for 8-PSK (Phase-shift keying) modulated signal at 4 dB), the algorithm 600 continues to a step 606; otherwise, if channel interference is equal to or above the threshold, the algorithm 600 continues to a step 608. The selected thresholds are related to implementation, and linked to the modulation types and rates. It could also be sensitive to the user case, hence dynamically adjusted. In general, higher order modulation uses higher threshold. In addition to GMSK and 8-PSK modulations listed above, QPSK, 16QAM, 32QAM, 64QAM, etc., can also have their own suitable thresholds, for example, at 3 dB to 4 dB, 7 dB to 9 dB, 10 dB to 13 dB, and 13 dB to 18 dB, respectively. In some aspects of the disclosure, static thresholds are able to handle the situation well, while in other aspects of the disclosure, the thresholds can be adaptive. In another aspect of the disclosure, a self-adjusting mechanism can be used to select the suitable threshold in various situations.

In the step 606, the UE may perform frequency and time tracking using information on the first carrier. In one aspect of the disclosure, the training sequence of a normal burst 402 on the first carrier may be utilized for frequency and time tracking and or estimation. In the step 608, the UE may perform frequency and time tracking on a second carrier. For example, the second carrier may be a CCCH carrier including BCCH, FCH, and SCH frames. The first carrier may be more prone to interference because it typically has lower power than the second carrier used for CCCH. In one aspect of the disclosure, information from the FCH and SCH frames may be utilized for frequency and time tracking and or estimation. For example, a frequency correction burst on the FCH may be used for frequency synchronization of the UE, and a synchronization burst on the SCH may be used for time synchronization of the UE. It should be appreciated that while the UE performs frequency and time tracking on the second carrier (step 608), the UE may maintain the communication link on the first carrier. In a step 610, the UE performs interference cancellation based on the frequency and time tracking information obtained in either step 606 or 608. In some aspects, the UE may utilize other channels (e.g., BCCH) on the second carrier in the step 608 to perform frequency and time tracking.

Figure 7:
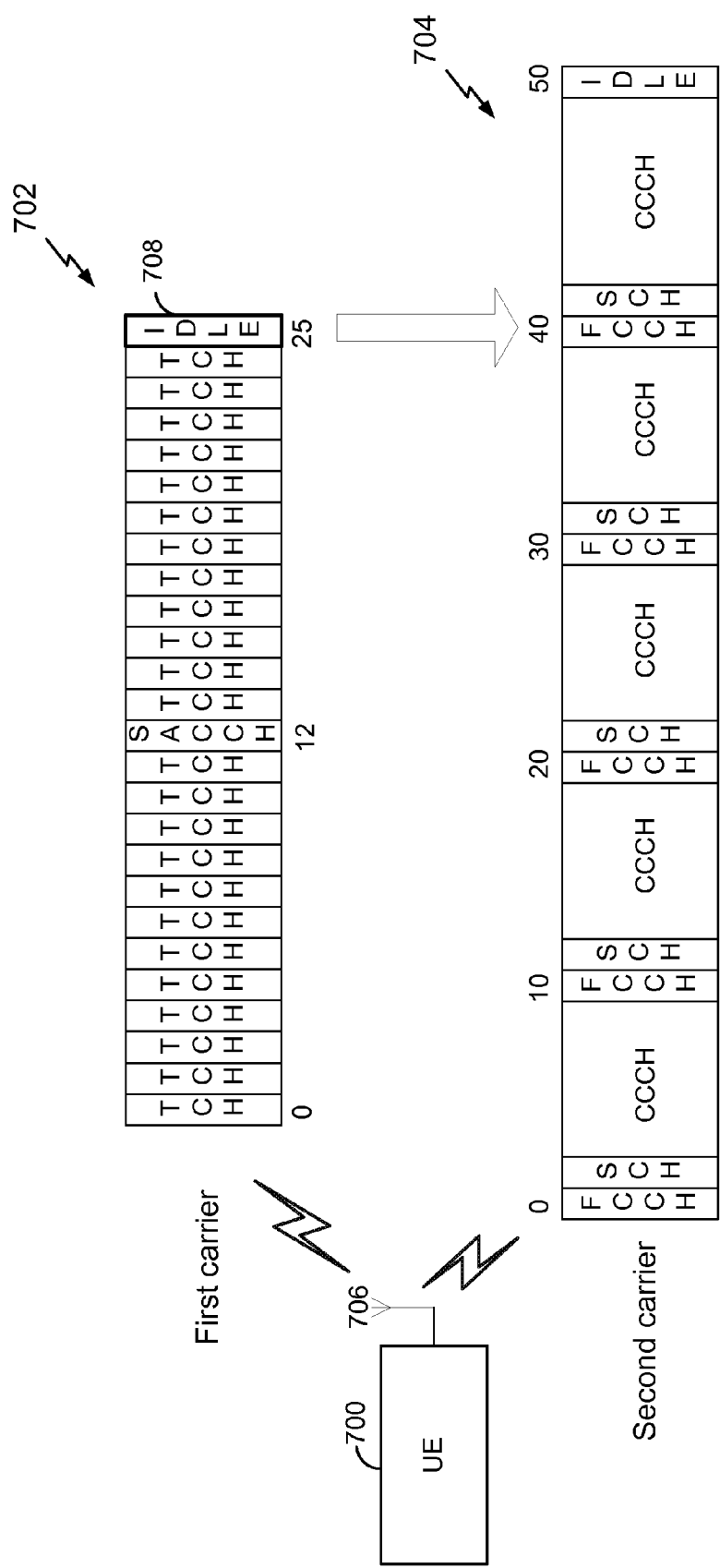
FIG. 7 is a drawing illustrating a user equipment utilizing a single antenna for monitoring a TCH multiframe on a first carrier and a signaling multiframe on a second carrier in accordance with an aspect of the disclosure.
Figure 8:
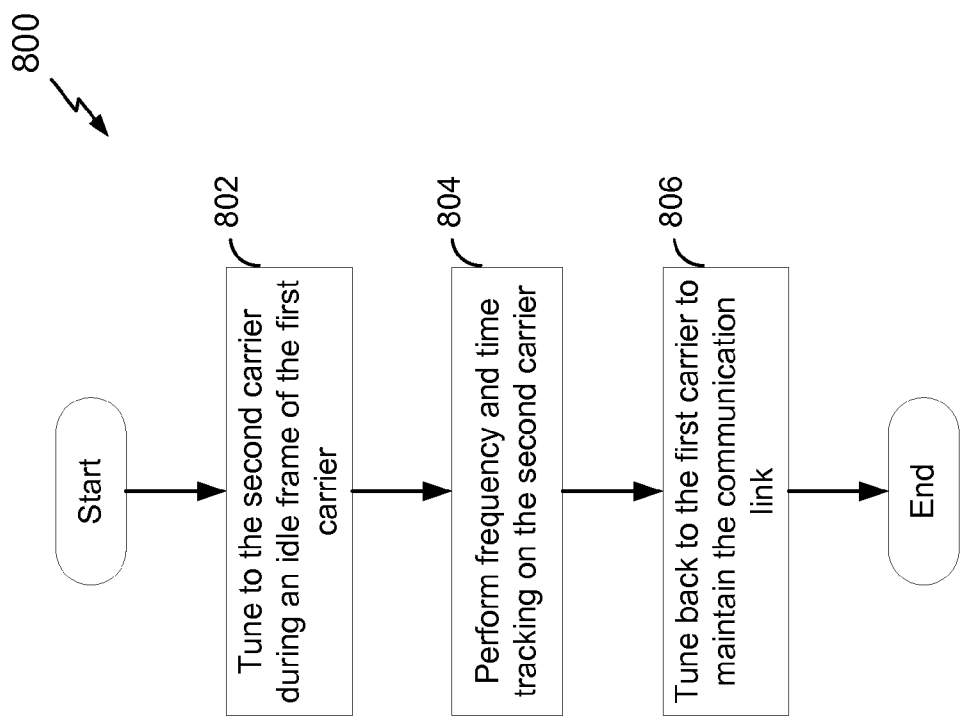
FIG. 8 is a flow chart illustrating a method of using a single antenna to perform the algorithm of FIG. 6 in accordance with an aspect of the disclosure.

In various aspects of the disclosure, a UE (e.g., UE 300) can utilize either a single antenna or dual antennas to perform frequency and time tracking in accordance with the algorithm 600. FIG. 7 is a drawing illustrating a UE 700 utilizing a single antenna 706 for monitoring a TCH multiframe on a first carrier 702 and a signaling multiframe on a second carrier 704. FIG. 8 is a flow chart illustrating a method 800 of using a single antenna to perform the algorithm 600 in accordance with an aspect of the disclosure. In various aspects of the disclosure, the UE 700 may be the UE 300.

Referring to both FIGS. 7 and 8, in a step 802, when a UE 700 determines that channel interference in the network (e.g., a first carrier 702) is equal to or over a certain threshold, the UE 700 may tune its antenna 706 to a second carrier 704 during the IDLE frame 708 of the TCH multiframe 702 such that the UE 700 may monitor, for example, the serving cell FCCH and SCH bursts on the second carrier 704 in a step 804. In between the IDLE frames 708 (only one IDLE frame is shown in FIG. 7) on the first carrier 702, the UE 700 may also perform estimation or tracking of frequency and time based on system information carried in the normal bursts on the first carrier 702 or even other bursts in timeslot 1 to timeslot 7 for getting a good frequency and time estimation. Then, the UE 700 tunes its antenna 706 back to the first carrier 702 in a step 806 to maintain the communication link on the first carrier 702.

Figure 9:
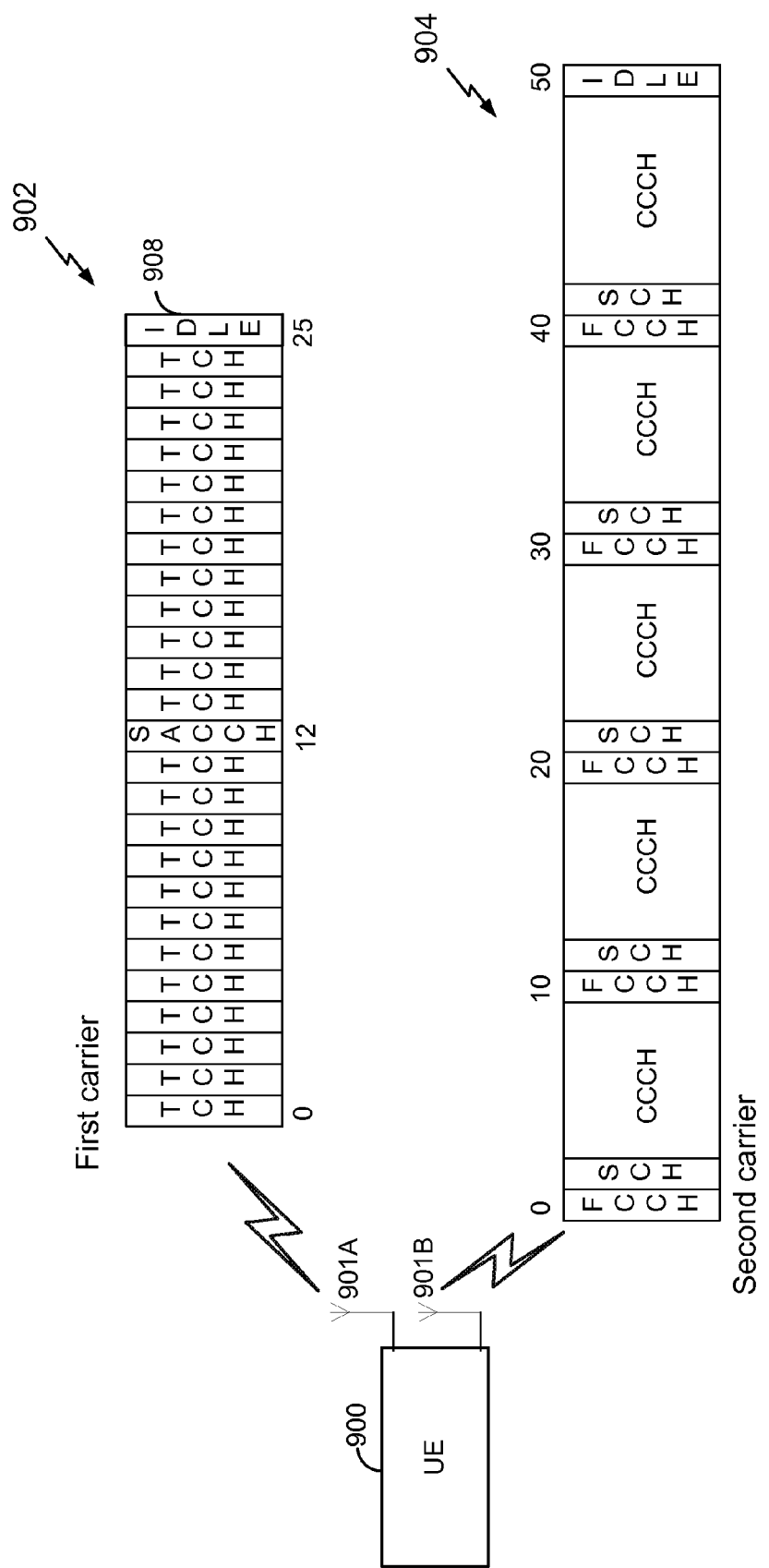
FIG. 9 is a drawing illustrating a user equipment utilizing two antennas for monitoring a TCH multiframe on a first carrier and a signaling multiframe on a second carrier, respectively.
Figure 10:
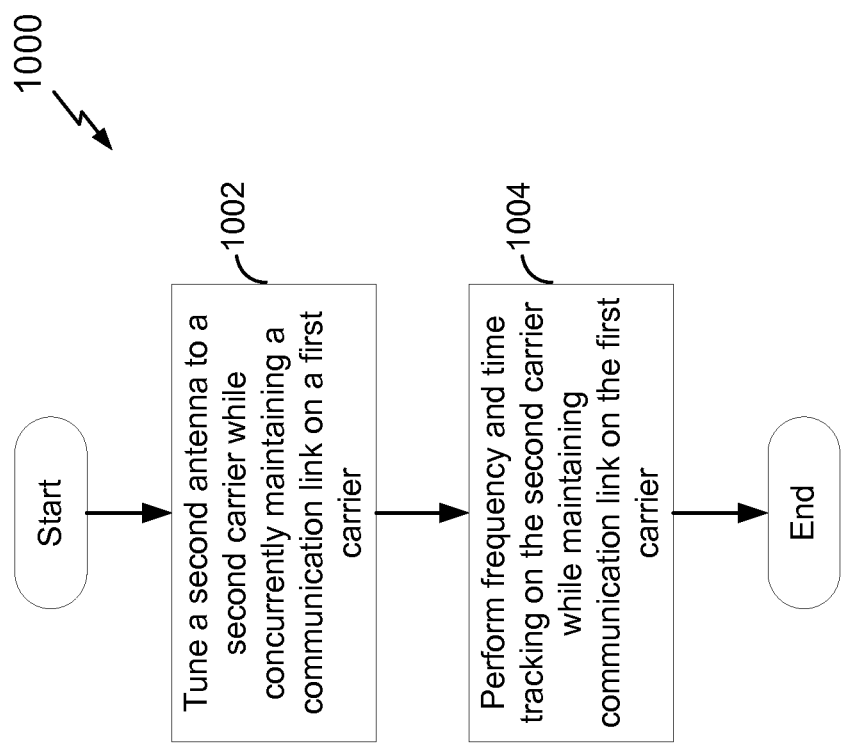
FIG. 10 is a flow chart illustrating a method of using dual antennas to perform the algorithm of FIG. 6 in accordance with an aspect of the disclosure.

FIG. 9 is a drawing illustrating a UE 900 utilizing two antennas 901A and 901B for monitoring a TCH multiframe on a first carrier 902 and a signaling multiframe on a second carrier 904, respectively. FIG. 10 is a flow chart illustrating a method 1000 of using dual antennas to perform the algorithm 600 in accordance with an aspect of the disclosure. In various aspects of the disclosure, the UE 900 may be the UE 300 that can be used to perform the method 1000. It is assumed that the UE 900 has already established a communication link (e.g., TCH) on the first carrier 902 utilizing the first antenna 901A. In a step 1002, when the UE 900 determines that channel interference in the network (e.g., first channel 902) is equal to or above a certain threshold, the UE 900 may configure or tune a second antenna 901B to a second carrier 904 while concurrently maintaining the communication link on the first carrier 902 using the first antenna 901A. Because the UE 900 has dual antennas, in a step 904, the UE 900 may utilize the second antenna 901B at any suitable time to perform frequency and time tracking on the second carrier 904. For example, the UE 900 may utilize the second antenna 901B to receive information from the FCCH and SCH frames on the second carrier 904 every ten frames so as to perform frequency and time tracking.

Figure 11:
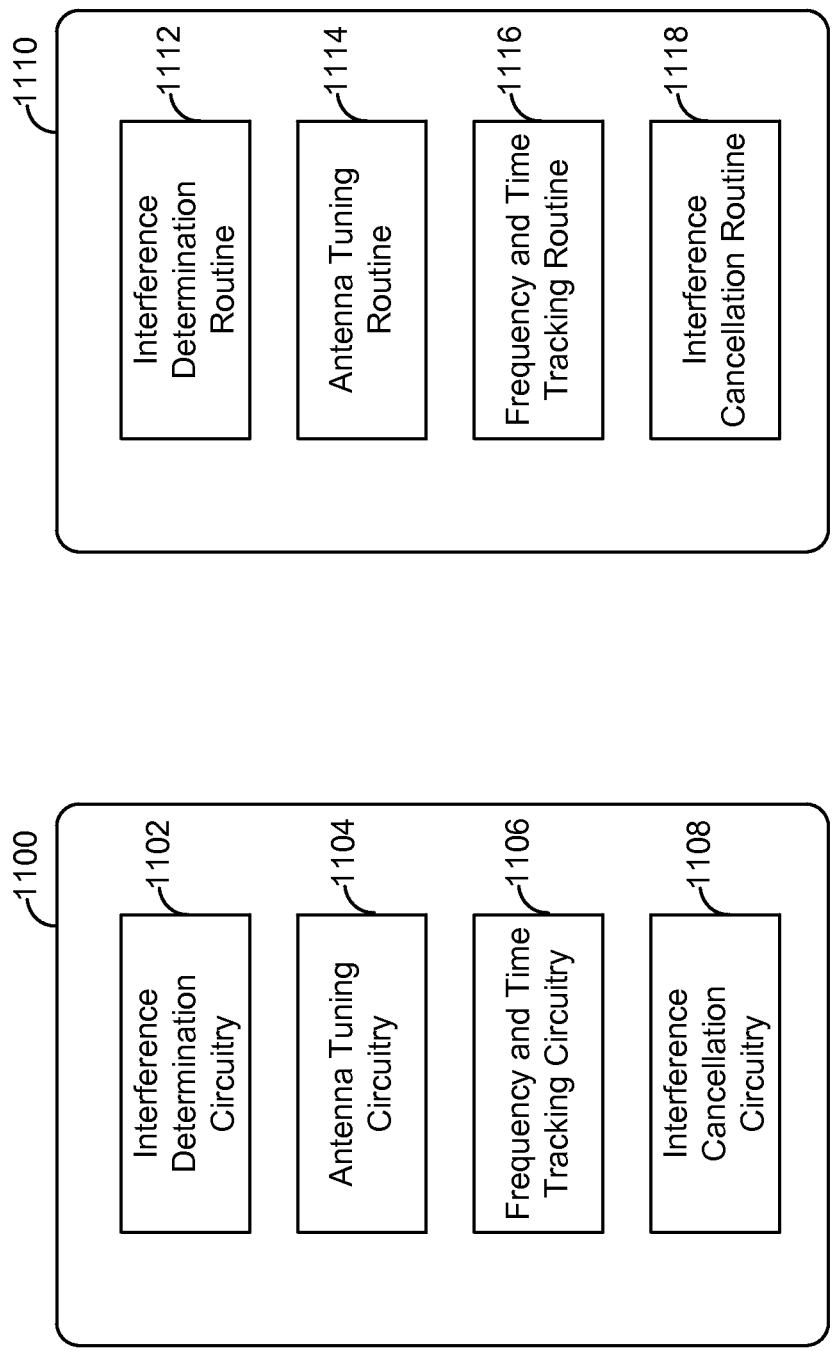
FIG. 11 is a drawing illustrating a processor and a computer-readable storage medium in accordance with aspects of the disclosure.

FIG. 11 is a drawing illustrating a processor 1100 and a computer-readable storage medium 1110 in accordance with aspects of the disclosure. The processor 1100 may be used as the processor 304 to perform the various algorithms and methods described in reference to FIGS. 1-10. The computer-readable storage medium 1110 may be used as the computer-readable storage medium 306. In one aspect, the processor 1100 includes an interference determination circuitry 1102, an antenna tuning circuitry 1104, a frequency and time tracking circuitry 1106, and an interference cancellation circuitry 1108. In one aspect, the computer-readable storage medium 1110 includes an interference determination routine 1112, an antenna tuning routine 1114, a frequency and time tracking routine 1116, and an interference cancellation routine 1118. A UE (e.g., UE 300) may utilize the interference determination circuitry 1102 and interference determination routine 1112 to determine whether or not channel interference in a first carrier (e.g., carrier 702 or 902) is equal to or above a certain threshold. The UE may utilize the antenna tuning circuitry 1104 and antenna tuning routine 1114 to tune an antenna to the first carrier or a second carrier (e.g., carrier 704 or 904). In some aspects of the disclosure, the UE may have multiple antennas that may be tuned to different frequencies concurrently. The UE may utilize the frequency and time tracking circuitry 1106, and frequency and time tracking routine 1116 to track and or estimate frequency and time on the first carrier and/or second carrier. The UE may utilize the interference cancellation circuitry 1108 and interference cancellation routine 1118 to perform any suitable interference cancellation algorithm.

Figure 12:
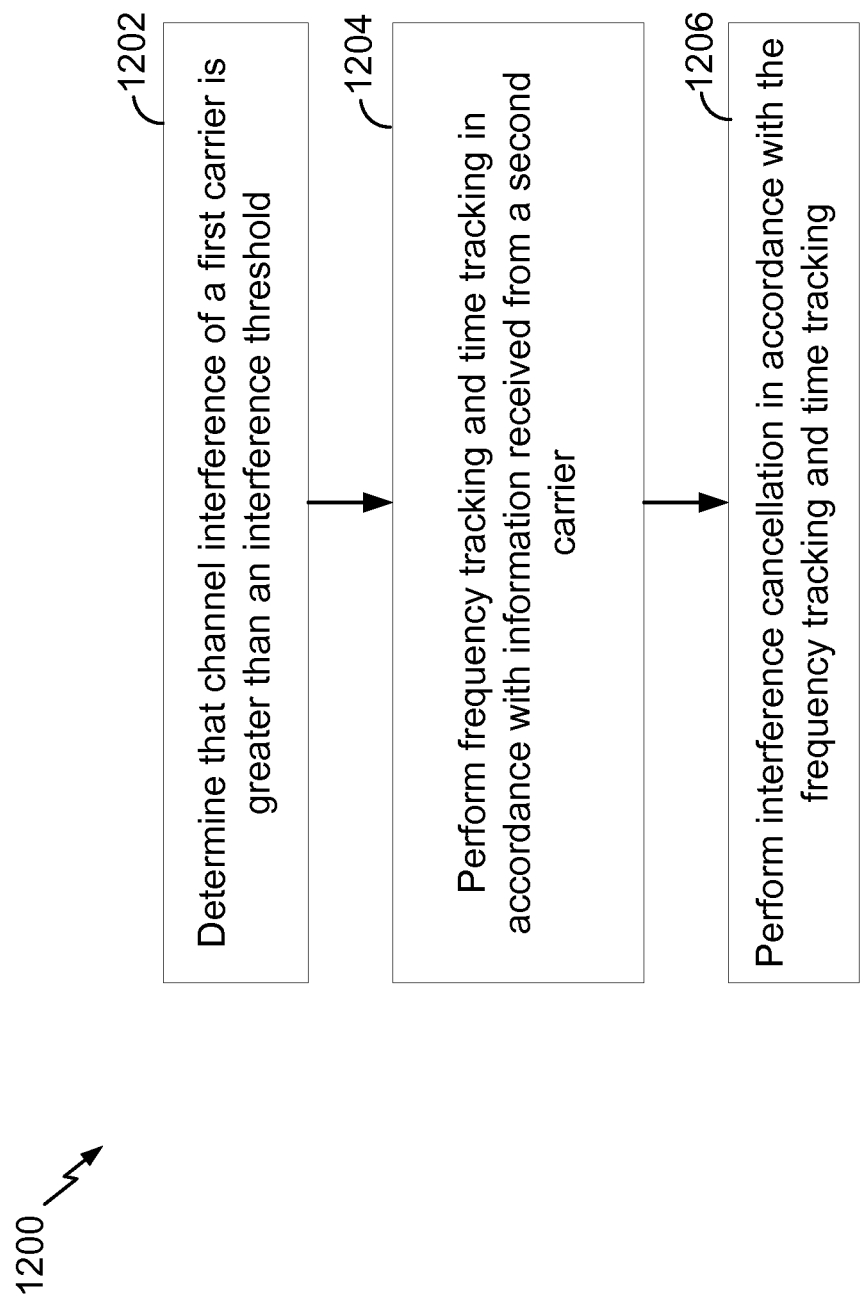
FIG. 12 is a flow chart illustrating a method of wireless communication using a signaling carrier for frequency and time estimation and tracking in accordance with an aspect of the disclosure.

FIG. 12 is flow chart illustrating a method 1200 of wireless communication operable at a user equipment (UE) in accordance with an aspect of the disclosure. According to this method, a UE (e.g., UE 700 or 900) determines that channel interference of a first carrier (e.g., carrier 702 or 902) is equal to or greater than an interference threshold (step 1202). Then, the UE may perform frequency tracking and time tracking in accordance with information received from a second carrier (e.g., carrier 704 or 904) (step 1204), and perform interference cancellation in accordance with the frequency tracking and time tracking (step 1206). The method 1200 may be performed in accordance with the algorithms and apparatuses described in reference to FIGS. 1-11.

Several aspects of a telecommunications system have been presented with reference to a GERAN system. As those skilled in the art will readily appreciate, various aspects described throughout this disclosure may be extended to other telecommunication systems, network architectures and communication standards.

By way of example, various aspects may be extended to systems employing UMTS (FDD, TDD), Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
 communicating with a base station via a first carrier and a second carrier, wherein the first carrier comprises a traffic channel and the second carrier comprises a control channel;
 determining channel interference of the first carrier;
 if the channel interference is greater than an interference threshold, performing frequency tracking and time tracking in accordance with information received from the second carrier;
 if the channel interference is not greater than the interference threshold, performing frequency tracking and time tracking in accordance with information received from the first carrier; and
 performing interference cancellation in accordance with the frequency tracking and time tracking.

2. The method of claim 1, wherein the information received from the second carrier comprises information from one or more common control channels (CCCHs).

3. The method of claim 2, wherein the CCCHs comprise a broadcast control channel (BCCH), a frequency correction channel (FCCH), and a synchronization channel (SCH).

4. The method of claim 1, further comprising maintaining a communication channel between the UE and the base station via the first carrier while performing the frequency tracking and time tracking.

5. The method of claim 4, wherein the communication channel comprises a traffic channel (TCH).

6. The method of claim 1, further comprising tuning an antenna of the UE from the first carrier to the second carrier to perform frequency tracking and time tracking on the second carrier.

7. The method of claim 6, wherein tuning the antenna comprises tuning away from the first carrier during an idle frame of the first carrier.

8. The method of claim 1, further comprising maintaining a communication channel on the first carrier utilizing a first antenna of the UE and, concurrently, tuning a second antenna of the UE to the second carrier to perform frequency tracking and time tracking.

9. An apparatus for wireless communication comprising:
 means for communicating with a base station via a first carrier and a second carrier, wherein the first carrier comprises a traffic channel and the second carrier comprises a control channel;
 means for determining channel interference of the first carrier;
 means for if the channel interference is greater than an interference threshold, performing frequency tracking and time tracking in accordance with information received from the second carrier;
 means for if the channel interference is not greater than the interference threshold, performing frequency tracking and time tracking in accordance with information received from the first carrier; and
 means for performing interference cancellation in accordance with the frequency tracking and time tracking.

10. The apparatus of claim 9, wherein the information received from the second carrier comprises information from one or more common control channels (CCCHs).

11. The apparatus of claim 10, wherein the CCCHs comprise a broadcast control channel (BCCH), a frequency correction channel (FCCH), and a synchronization channel (SCH).

12. The apparatus of claim 9, further comprising means for maintaining a communication channel between the apparatus and the base station via the first carrier while performing the frequency tracking and time tracking.

13. The apparatus of claim 12, wherein the communication channel comprises a traffic channel (TCH).

14. The apparatus of claim 9, further comprising means for tuning an antenna of the apparatus from the first carrier to the second carrier to perform frequency tracking and time tracking on the second carrier.

15. The apparatus of claim 14, wherein the means for tuning the antenna comprises means for tuning away the antenna from the first carrier during an idle frame of the first carrier.

16. The apparatus of claim 9, further comprising means for maintaining a communication channel on the first carrier utilizing a first antenna of the apparatus and, concurrently, tuning a second antenna of the apparatus to the second carrier to perform frequency tracking and time tracking.

17. An apparatus for wireless communication comprising:
 at least one processor;
 a memory coupled to the at least one processor; and
 a transceiver coupled to the at least one processor;
 wherein the at least one processor is configured to:
  communicate with a base station via a first carrier and a second carrier, wherein the first carrier comprises a traffic channel and the second carrier comprises a control channel;
  determine channel interference of the first carrier;
  if the channel interference is greater than an interference threshold, perform frequency tracking and time tracking in accordance with information received from the second carrier;
  if the channel interference is not greater than the interference threshold, perform frequency tracking and time tracking in accordance with information received from the first carrier; and
  perform interference cancellation in accordance with the frequency tracking and time tracking.

18. The apparatus of claim 17, wherein the information received from the second carrier comprises information from one or more common control channels (CCCHs).

19. The apparatus of claim 18, wherein the CCCHs comprise a broadcast control channel (BCCH), a frequency correction channel (FCCH), and a synchronization channel (SCH).

20. The apparatus of claim 17, wherein the at least one processor is further configured to maintain a communication channel between the apparatus and the base station via the first carrier while performing the frequency tracking and time tracking.

21. The apparatus of claim 20, wherein the communication channel comprises a traffic channel (TCH).

22. The apparatus of claim 17, wherein the at least one processor is further configured to tune an antenna of the apparatus from the first carrier to the second carrier to perform frequency tracking and time tracking on the second carrier.

23. The apparatus of claim 22, wherein the at least one processor is further configured to tune the antenna away from the first carrier during an idle frame of the first carrier.

24. The apparatus of claim 17, wherein the at least one processor is further configured to maintain a communication channel on the first carrier utilizing a first antenna of the apparatus and, concurrently, tune a second antenna of the apparatus to the second carrier to perform frequency tracking and time tracking.

25. A computer program product, comprising:
a computer-readable storage medium comprising code for causing a user equipment (UE) to:
communicate with a base station via a first carrier and a second carrier, wherein the first carrier comprises a traffic channel and the second carrier comprises a control channel;
determine channel interference of the first carrier;
if the channel interference is greater than an interference threshold, perform frequency tracking and time tracking in accordance with information received from the second carrier;
if the channel interference is not greater than the interference threshold, perform frequency tracking and time tracking in accordance with information received from the first carrier; and
perform interference cancellation in accordance with the frequency tracking and time tracking.

26. The computer program product of claim 25, wherein the information received from the second carrier comprises information from one or more common control channels (CCCHs).

27. The computer program product of claim 26, wherein the CCCHs comprise a broadcast control channel (BCCH), a frequency correction channel (FCCH), and a synchronization channel (SCH).

28. The computer program product of claim 25, further comprising code for causing the UE to maintain a communication channel between the UE and the base station via the first carrier while performing the frequency tracking and time tracking.

29. The computer program product of claim 28, wherein the communication channel comprises a traffic channel (TCH).

30. The computer program product of claim 25, further comprising code for causing the UE to tune an antenna of the UE from the first carrier to the second carrier to perform frequency tracking and time tracking on the second carrier.

31. The computer program product of claim 30, further comprising code for causing the UE to tune the antenna away from the first carrier during an idle frame of the first carrier.

32. The computer program product of claim 25, further comprising code for causing the UE to maintain a communication channel on the first carrier utilizing a first antenna of the UE and, concurrently, tuning a second antenna of the UE to the second carrier to perform frequency tracking and time tracking.

* * * * *